(12) United States Patent
Reuter

(10) Patent No.: US 6,997,619 B2
(45) Date of Patent: Feb. 14, 2006

(54) CLUTCH RELEASE MECHANISM WITH A DEVICE FOR COMPENSATING FOR LACK OF PRECISION IN A FRICTION CLUTCH OF A MOTOR VEHICLE

(75) Inventor: Klaus Reuter, Oberthulba-Hetzlos (DE)

(73) Assignee: ZF Sachs AG, Schweinfurt (DE)

(*) Notice: Subject to any disclaimer, the term of this patent is extended or adjusted under 35 U.S.C. 154(b) by 58 days.

(21) Appl. No.: 10/465,082

(22) Filed: Jun. 19, 2003

(65) Prior Publication Data

US 2004/0033000 A1    Feb. 19, 2004

(30) Foreign Application Priority Data

Jun. 20, 2002  (EP) ................. 02013663

(51) Int. Cl.
*F16C 19/10*    (2006.01)

(52) U.S. Cl. .................................. 384/615

(58) Field of Classification Search ........... 384/615, 384/612, 617, 620, 609
See application file for complete search history.

(56) References Cited

U.S. PATENT DOCUMENTS 6,126,324 A    10/2000  Ponson et al.

FOREIGN PATENT DOCUMENTS

| EP | 0 241 810 A1 | 10/1987 |
|---|---|---|
| FR | 2 805 579 A1 | 8/2001 |
| GB | 2 339 000 | 1/2000 |

*Primary Examiner*—Lenard A. Footland
(74) *Attorney, Agent, or Firm*—Cohen, Pontani, Lieberman & Pavane

(57) ABSTRACT

A clutch-release mechanism for actuating the friction clutch of a motor vehicle, installed concentrically around a guide sleeve, includes a release bearing with an inner ring and an outer ring as well as a sliding sleeve. The inner ring is in working contact with a release spring of the friction clutch and the outer ring is in working contact with the sliding sleeve by way of a sliding surface, and the release mechanism has both a first device for compensating for a tilt of the center axis of the friction clutch with respect to the center axis of the guide sleeve and/or for a wobbling eccentricity of the release spring, and a second device for compensating for an offset between the above-mentioned center axes. The first device consists of a modified raceway for the balls, where the race has both a first race radius and a second race radius to form a surface in the form of a spherical segment, where differences between the angles of the release spring and of the release bearing are compensated. Because the raceway can be produced in any case with high precision in the outer ring and because the rolling contact of the parts is lubricated with grease and protected from the outside environment by seals, no additional components are required for the release mechanism, and there are no additional friction points to be lubricated and sealed.

5 Claims, 2 Drawing Sheets

CLUTCH RELEASE MECHANISM WITH A DEVICE FOR COMPENSATING FOR LACK OF PRECISION IN A FRICTION CLUTCH OF A MOTOR VEHICLE

BACKGROUND OF THE INVENTION

1. Field of the Invention

The invention relates to a clutch release mechanism for actuating a friction clutch between an internal combustion engine and a transmission of a motor vehicle. This mechanism is installed as concentric assembly around a guide sleeve mounted on a transmission shaft, comprising a release bearing with an inner ring and an outer ring as well as a sliding sleeve, where one of the rings, preferably the inner ring, is in working connection with a release spring of the friction clutch and the outer ring is in working connection with the sliding sleeve. The assembled release mechanism has a first device for compensating for a tilt of the center axis of the friction clutch with respect to the center axis of the guide sleeve and/or for a wobbling eccentricity of the release spring and a second device for compensating for an offset between the previously mentioned center axes.

2. Description of the Related Art

DE 199 12 431 A1 (equivalent to UK patent application GB 2 339 000) discloses a clutch release mechanism for a friction clutch of a motor vehicle. This mechanism includes a release bearing, which is mounted on a sliding sleeve, and a disk spring, which belongs to the friction clutch and is in working connection with the release bearing. Particularly, the disclosed mechanism includes two areas with complementary surfaces in the form of segments of a sphere which are provided between the disk spring and the release bearing. The two areas with the surfaces in the form of spherical segments are provided directly or indirectly on the disk spring, and the areas forming the surfaces in the form of spherical segments can be shifted radially toward the release bearing.

The areas connected in this way by surfaces in the form spherical segments are slide on each other and are formed from in part by the tongues or a compensating ring which is mounted between the disk spring and a flange part provided to serve as the pressure plate of the release bearing. In addition, the spherical surfaces on the rings are produced primarily by a grinding process, which increases costs related to both the production and the material of the rings.

SUMMARY OF THE INVENTION

As the first device for compensating for a tilt of the center axis of the friction clutch with respect to the center axis of the guide sleeve and/or for a wobbling eccentricity of the release spring, the proposed clutch-release mechanism according to the invention has a modified race for the balls of the release bearing, preferably in the outer ring. As is known in the art, this race includes a first race radius, which, as the osculation radius, is only slightly larger than the radius of the balls. According to the present invention, this race radius is interrupted by a second race radius, which is much larger than the osculation radius and has its starting point on the center axis of the guide sleeve. It can be concluded from the fact that the second race radius has its starting point on the center axis of the guide sleeve that the ring-shaped surface formed by the second race radius is a surface in the form of a spherical segment, which, in functional terms, represents a ball joint for the inner ring. As an angular-contact ball bearing with the ability to oscillate, the inner ring of the release bearing can therefore react to an eccentric wobbling of the release spring by following the imprecise course of the rotating tongues during which process the balls in the spherically shaped surface of the first race radius do not roll in a plane perpendicular to the center axis of the guide sleeve but rather along a track which is at an angle to this plane. This track, which oscillates from one side to another, can deflect only as far as a specific maximum deflection angle, where the width of the surface in the shape of a spherical segment is determined by the adjacent halves of the first race radius. The force exerted by the balls on the spherical surface depends on the position of the second race radius, where the resulting bearing pressure angle decreases as the starting point of the second race radius moves closer to the release bearing.

According to the present invention, a second device has a sliding surface between the release bearing and the sliding sleeve in a plane perpendicular to the center axis of the guide sleeve to compensate for an offset between the center axis of the friction clutch and the center axis of the guide sleeve. The release bearing can be pushed along this sliding surface with respect to the sliding sleeve within certain limits and, thus, can be moved out of its coaxial position with respect to the guide sleeve. The two devices can be combined in one release mechanism, it being advisable in this case for the release bearing to accompany the movements of the clutch spring by virtue of the contact of the rotating inner ring of the bearing with the tongues of the clutch spring, for which reason the two devices must be installed between the release bearing and the guide sleeve.

The sliding surface of the release mechanism described above is located on the outer ring of the release bearing in a plane perpendicular to the center axis of the guide sleeve, where, within certain limits, the release bearing can be pushed along the sliding of the sliding sleeve and thus moved out of a position coaxial with respect to the guide sleeve. Because the release bearing and the sliding sleeve are connected elastically together by a clamp, static friction is created, which stabilizes the release bearing when it has moved off-center. A ring-shaped stop is provided on the sliding surface of the sliding sleeve. The outer ring can make contact with this stop, which limits the extent to which the outer ring can be deflected from its centered position.

It is an object of the present invention to provide a clutch-release mechanism for actuating the release spring of a friction clutch of a motor vehicle which has a device for compensating for a tilt of the center axis of the friction clutch with respect to the center axis of a guide sleeve and/or for compensating for an offset of the above-mentioned center axes and/or for a wobbling eccentricity of the release spring. Preferably, such a mechanism occupies a minimal amount of space and has a minimal cost.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
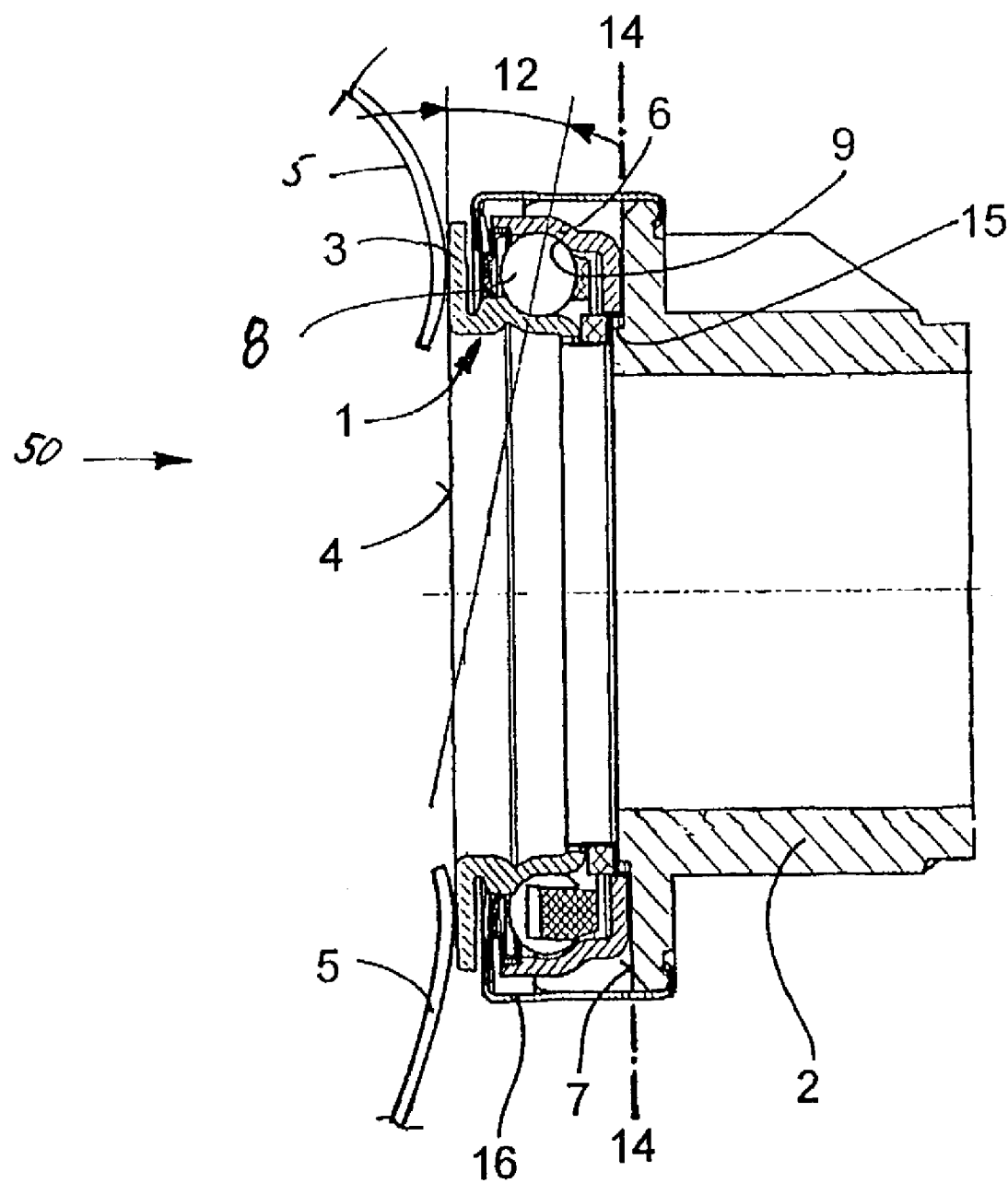
FIG. 1 is a cross-sectional view of a clutch-release mechanism with a sliding sleeve and a release bearing with an outer ring and an inner ring, the mechanism also including a common slide face between the outer ring and the sliding sleeve in a phase perpendicular to the center axis of the sliding sleeve.

FIG. 1 shows a clutch-release mechanism 50 for actuating a friction clutch using a release spring 5. The release mechanism 50 has a release bearing 1, which is a ball bearing with an inner ring 3, balls 8, and an outer ring 6. The inner ring 3 rests by a contact surface 4 against the tongues of the release spring 5. The outer ring 6 has a sliding surface 7 indirectly or directly in common with a sliding sleeve 2 in a plane 14 transverse to the center axis of the release bearing 1. The sliding sleeve has a ring-shaped stop 15 for the outer ring 6 of the release bearing 1. A clamp 16 connects the release bearing 1 to the sliding sleeve 2 to form a structural unit.

Figure 2:
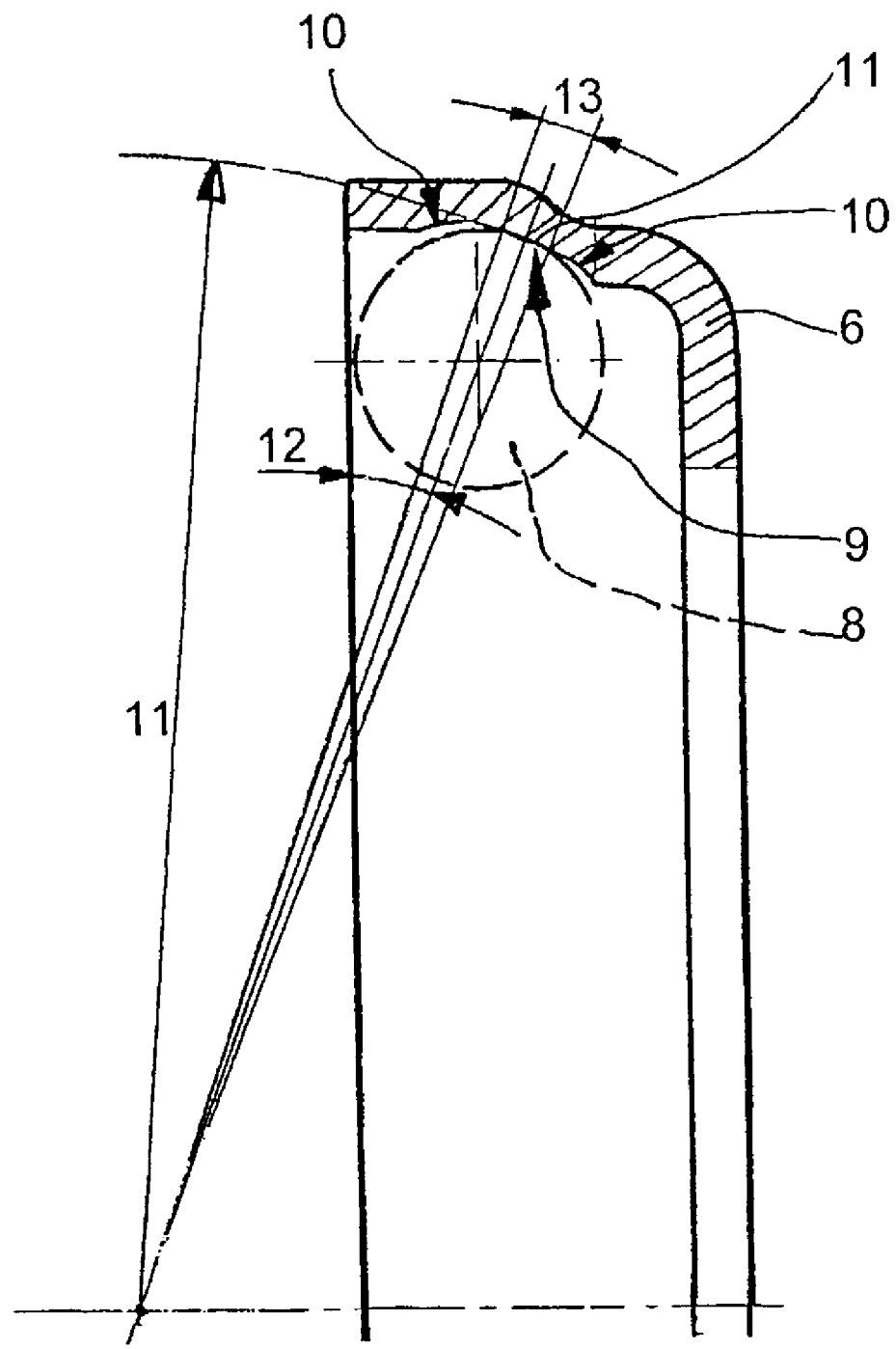
FIG. 2 is a partial cross-sectional view of the outer ring with a race consisting of several segments.

In FIG. 2, the outer ring 6 has a race 9 which includes a ring-shaped surface with a first race radius 10, an intermediate ring-shaped surface with a second race radius 11, and an inner ring-shaped surface, again with the first race radius 10. As the balls 8 rotate in the outer ring 6, they can move within a deflection angle 13. They are guided in a conventional race in the inner ring 3.

The advantage of the first device consists in that only the race 9 for the balls 8 must be modified, preferably in the outer ring 6, in that a second race radius 11 is machined into the ring next to a first race radius 10 to form a surface in the form of a spherical segment, where differences between the angle of the release spring 5 and the angle of the release bearing 1 can thus be compensated. Because the race 9 can be in any case produced in the outer ring 6 with high precision and because the rolling contact between the parts is lubricated with grease and protected by seals from the outside environment, no additional components are required for the release mechanism, and no additional friction points are present which must be lubricated and sealed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A clutch release bearing for installation around a guide sleeve mounted on a transmission shaft between an internal combustion engine and a transmission in a motor vehicle, said friction clutch and said guide sleeve having respective center axes, said bearing comprising:
   an inner ring having an inner race, said inner ring, when installed, being in working connection with one of said friction clutch and said guide sleeve; and
   an outer ring having an outer race, said outer ring, when installed, being in working connection with the other of said friction clutch and said guide sleeve; and
   a plurality of balls between said inner race and said outer race;
   wherein one of said inner race and said outer race has a first race portion with a first race radius and a second race portion with a second race radius which is larger than said first race radius, said radii lying in a plane containing said central axis of said guide sleeve, said second race radius being centered on the center axis of the guide sleeve.

2. A clutch release mechanism as in claim 1 wherein said bearing is an angular contact bearing, said first race radius having a conventional osculation with respect to said balls.

3. A clutch release bearing as in claim 1 wherein said one of said races has two said first race portions, said second race portion interrupting said first race portions.

4. A clutch release bearing as in claim 1 wherein said outer race has said first and second race portions.

5. A clutch release bearing as in claim 4 wherein said second race portion has a width which defines a deflection angle about which said second ring can oscillate relative to said first ring.

* * * * *